United States Patent
Ashida et al.

(10) Patent No.: US 8,743,238 B2
(45) Date of Patent: Jun. 3, 2014

(54) IMAGE PROCESSING APPARATUS, IMAGING APPARATUS, IMAGE PROCESSING METHOD, AND WHITE BALANCE ADJUSTMENT METHOD

(71) Applicant: FUJIFILM Corporation, Tokyo (JP)

(72) Inventors: Tetsuro Ashida, Saitama (JP); Satoru Obinata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/900,203

(22) Filed: May 22, 2013

(65) Prior Publication Data

US 2013/0258134 A1    Oct. 3, 2013

Related U.S. Application Data

(63) Continuation of application No. PCT/JP2011/075671, filed on Nov. 8, 2011.

(30) Foreign Application Priority Data

Nov. 30, 2010   (JP) ................. 2010-267053

(51) Int. Cl.
*H04N 9/73*         (2006.01)
(52) U.S. Cl.
USPC ..................... 348/223.1; 348/226.1
(58) Field of Classification Search
CPC ............ H04N 5/2256; H04N 5/2357; H04N 5/23219; H04N 9/735
See application file for complete search history.

(56) References Cited

U.S. PATENT DOCUMENTS

| | | | |
|---|---|---|---|
| 5,282,022 A * | 1/1994 | Haruki et al. | 348/223.1 |
| 6,727,942 B1 | 4/2004 | Miyano | |
| 7,742,098 B2 * | 6/2010 | Kawakami | 348/371 |
| 8,089,524 B2 * | 1/2012 | Urisaka | 348/222.1 |
| 2001/0007470 A1 * | 7/2001 | Haavisto | 348/223 |
| 2003/0112343 A1 | 6/2003 | Katoh et al. | |
| 2005/0195290 A1 | 9/2005 | Takeshita | |
| 2007/0182831 A1 | 8/2007 | Katoh et al. | |
| 2008/0106636 A1 | 5/2008 | Wernersson | |
| 2008/0303925 A1 * | 12/2008 | Oota | 348/234 |
| 2009/0135276 A1 | 5/2009 | Urisaka | |
| 2010/0225780 A1 | 9/2010 | Shimizu | |

FOREIGN PATENT DOCUMENTS

| | | |
|---|---|---|
| CN | 01159879 A | 4/2008 |
| CN | 101536493 A | 9/2009 |
| JP | 2000-92509 A | 3/2000 |
| JP | 2003-189129 A | 7/2003 |

(Continued)

OTHER PUBLICATIONS

Office Action issued Jan. 26, 2014 in corresponding Chinese Application No. 201180057647.2.

*Primary Examiner* — Luong T Nguyen
(74) *Attorney, Agent, or Firm* — Birch, Stewart, Kolasch & Birch, LLP.

(57) ABSTRACT

In an image processing method according to an aspect of the presently disclosed subject matter, a captured image obtained by continuous imaging is acquired, the captured image is divided into a plurality of divided areas, a flicker that flashes is detected for each of the divided areas, it is detected, for each of the divided areas where the flicker has been detected, whether a divided area is an LED area including light from a light emitting diode (LED) based on a luminance difference between a luminance in a turn-on state and a luminance in an turn-off state, and LED area information is output.

21 Claims, 9 Drawing Sheets

(56) References Cited

FOREIGN PATENT DOCUMENTS

| JP | 2005-192015 A | 7/2005 |
| JP | 2006-54775 A | 2/2006 |
| JP | 2008-235955 A | 10/2008 |
| JP | 2009-118001 A | 5/2009 |
| JP | 2009-130845 A | 6/2009 |
| JP | 2010-130468 A | 6/2010 |
| JP | 2010-135921 A | 6/2010 |

* cited by examiner

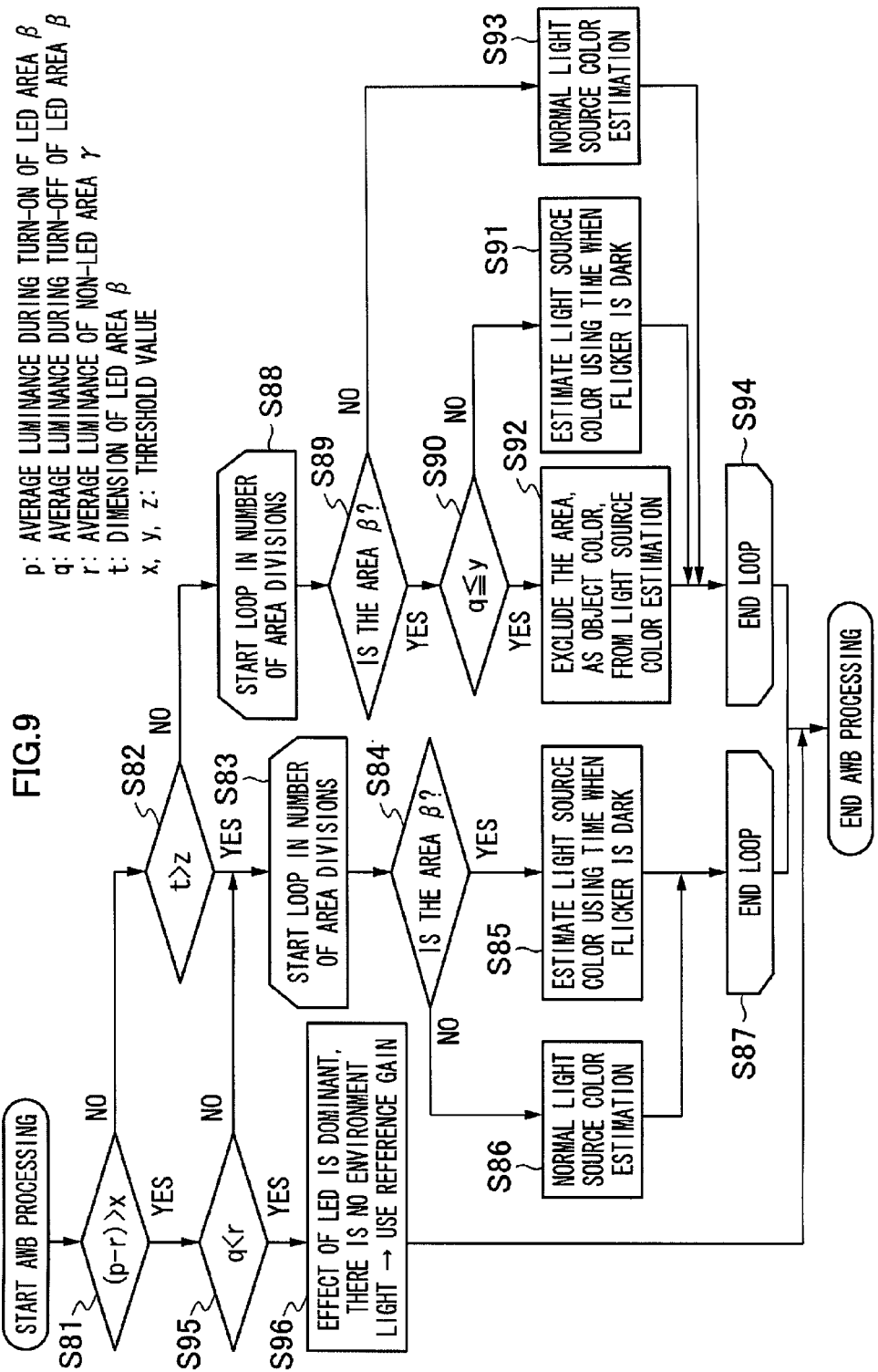

IMAGE PROCESSING APPARATUS, IMAGING APPARATUS, IMAGE PROCESSING METHOD, AND WHITE BALANCE ADJUSTMENT METHOD

CROSS-REFERENCE TO RELATED APPLICATIONS

This application is a PCT Bypass continuation application and claims the priority benefit under 35 U.S.C. §120 of PCT Application: No. PCT/JP2011/075671 filed on Nov. 8, 2011 which application designates the U.S., and also claims the priority benefit under 35 U.S.C. §119 of Japanese Patent Application: No. 2010-267053 filed on Nov. 30, 2010, which applications are all hereby incorporated in their entireties by reference.

BACKGROUND OF THE INVENTION

1. Field of the Invention

The presently disclosed subject matter relates to an image processing apparatus, an imaging apparatus, an image processing method, and a white balance adjustment method capable of detecting, when a subject including light from a LED (Light Emitting Diode) that flashes is imaged, an LED area including the light from the LED with high accuracy.

2. Description of the Related Art

A monochrome light emitting diode used for illumination differs in a spectral characteristic and a flicker (periodical flashing) from a general light source for illumination, and may greatly affect a white balance function of a camera.

Japanese Patent Application Laid-Open No. 2010-130468 discloses a configuration in which light sources can be accurately detected with respect to a subject that is illuminated by a plurality of light sources and a subject in which an object color exists.

Japanese Patent Application Laid-Open No. 2009-118001 discloses a configuration in which white balance correction can be performed in consideration of a change in color temperature due to an individual difference and aged deterioration of a light emitting diode when an LED illumination is used.

SUMMARY OF THE INVENTION

In the case of a scene in which a monochrome LED for illumination or the like is directly viewed, high-luminance information enters human eyes so that an image lag effect is greatly exerted thereon. More specifically, a flicker becomes less prominent than what appears when it is used as environment light. From such a situation, a monochrome LED apparatus, which does not remove generation of a flicker due to cost reduction and installation facility, may be used in many cases.

Such a monochrome LED apparatus, which generates a flicker, includes an LED traffic light, an illumination, and an electric bulletin board.

In the configuration discussed in Japanese Patent Application Laid-Open No. 2010-130468, a light source color estimation area and its distance are calculated from a subject, and the effect of a monochrome LED cannot be clearly eliminated from the object color.

In the configuration discussed in Japanese Patent Application Laid-Open No. 2009-118001, it is assumed that an LED is an illumination, and appropriate white balance correction may be unable to be performed when there is an LED that is not illumination light.

The presently disclosed subject matter has been made in view of such a situation, and has for its object to provide an image processing apparatus, an imaging apparatus, an image processing method, and a white balance adjustment method capable of detecting, when a subject including light from an LED that flashes is imaged, an LED area including the light from the LED with high accuracy.

To achieve the above-mentioned subject, an image processing apparatus according to one aspect of the presently disclosed subject matter includes image acquisition means for acquiring a captured image obtained by continuous imaging, flicker detection means for dividing the captured image into a plurality of divided areas and detecting a flicker that flashes for each of the divided areas, and comparison means for detecting, for each of the divided areas where the flicker has been detected, whether the divided area is an LED area including light from an LED based on a luminance difference between a luminance in a turn-on state of the divided area and a luminance thereof in a turn-off state, and outputting LED area information representing the LED area within the captured image. More specifically, when a subject including the light from the LED that flashes is imaged, the flicker (flashing) is detected for each of the divided areas obtained by dividing the captured image while the LED area in the captured image is detected based on the luminance difference between the luminance in the turn-on state of the divided area and the luminance thereof in the turn-off state so that the LED area including the light from the LED that flashes can be detected with high accuracy.

The image processing apparatus according to one aspect of the presently disclosed subject matter may further include white balance calculation means for calculating a white balance adjustment value based on the detected LED area information, and white balance adjustment means for adjusting a white balance of the captured image or an image that has been captured subsequently to the captured image based on the calculated white balance adjustment value. In this case, even when the LED area exists, appropriate white balance adjustment can be performed.

In the image processing apparatus according to one aspect of the presently disclosed subject matter, the white balance calculation means may determine that the LED area is an object color area that is strongly affected by an object color while determining a light source color based on information within an area, other than the LED area, in the captured image, to calculate the white balance adjustment value based on the light source color. In this case, the LED area is excluded from a light source color determination target area as not the light source color area but the object color area so that appropriate white balance adjustment according to environment light can be performed.

In the image processing apparatus according to one aspect of the presently disclosed subject matter, the white balance calculation means may determine, when ratio of the LED area in the captured image is more than a threshold value, a light source color based on at least one of a spectral characteristic of the LED and information within the LED area, to calculate the white balance adjustment value based on the light source color. In this case, if the ratio of the LED area is large, when the light source color is determined by only the remaining non-LED area, there are problems such as erroneous determination and occurrence of hunching, but the light source color is determined based on at least one of the spectral characteristic of the LED and the information within the LED area so that appropriate white balance adjustment can be performed.

In the image processing apparatus according to one aspect of the presently disclosed subject matter, the white balance calculation means may determine, when a difference between the color of the LED area and an average of colors in the entire captured image or an average of colors in a non-LED area, other than the LED area, in the captured image is more than a threshold value, a light source color different from the color of the LED area from information within the non-LED area, to calculate the white balance adjustment value based on the light source color.

In the image processing apparatus according to one aspect of the presently disclosed subject matter, the white balance calculation means may determine, when a luminance of the LED area in the turn-off state is a threshold value or less, the light source color based on information within an area, other than the LED area, in an entire area of the captured image, to calculate the white balance adjustment value based on the light source color.

In the image processing apparatus according to one aspect of the presently disclosed subject matter, the white balance calculation means may determine, when a luminance difference between a luminance of the LED area and a luminance of the non-LED area is less than a threshold value, the light source color based on at least one of a spectral characteristic of the LED and information within the LED area, to calculate the white balance adjustment value based on the light source color.

In the image processing apparatus according to one aspect of the presently disclosed subject matter, the white balance calculation means may determine the light source color based on the information within the LED area in the turn-off state, to calculate the white balance adjustment value based on the light source color.

In the image processing apparatus according to one aspect of the presently disclosed subject matter, the white balance calculation means may adjust a follow-up intensity of the white balance adjustment value to an object color based on the detected information within the LED area.

In the image processing apparatus according to one aspect of the presently disclosed subject matter, the LED area information may be recorded on a recording medium in association with the captured image.

An imaging apparatus according to one aspect of the presently disclosed subject matter includes the above-mentioned image processing apparatus, and imaging means capable of continuously imaging a subject.

In the imaging apparatus according to one aspect of the presently disclosed subject matter, an exposure amount may be calculated based on the detected LED area information, and the imaging means may perform imaging depending on the exposure amount.

According to the presently disclosed subject matter, if a subject including light from an LED that flashes is imaged, a LED area including the light from the LED can be detected with high accuracy.

BRIEF DESCRIPTION OF THE DRAWINGS

FIG. 9 is a flowchart illustrating an example of white balance calculation processing in a fourth embodiment.

DETAILED DESCRIPTION OF THE EMBODIMENTS

Embodiments of the presently disclosed subject matter will be described in detail below with reference to the accompanying drawings.

First Embodiment

Figure 1:
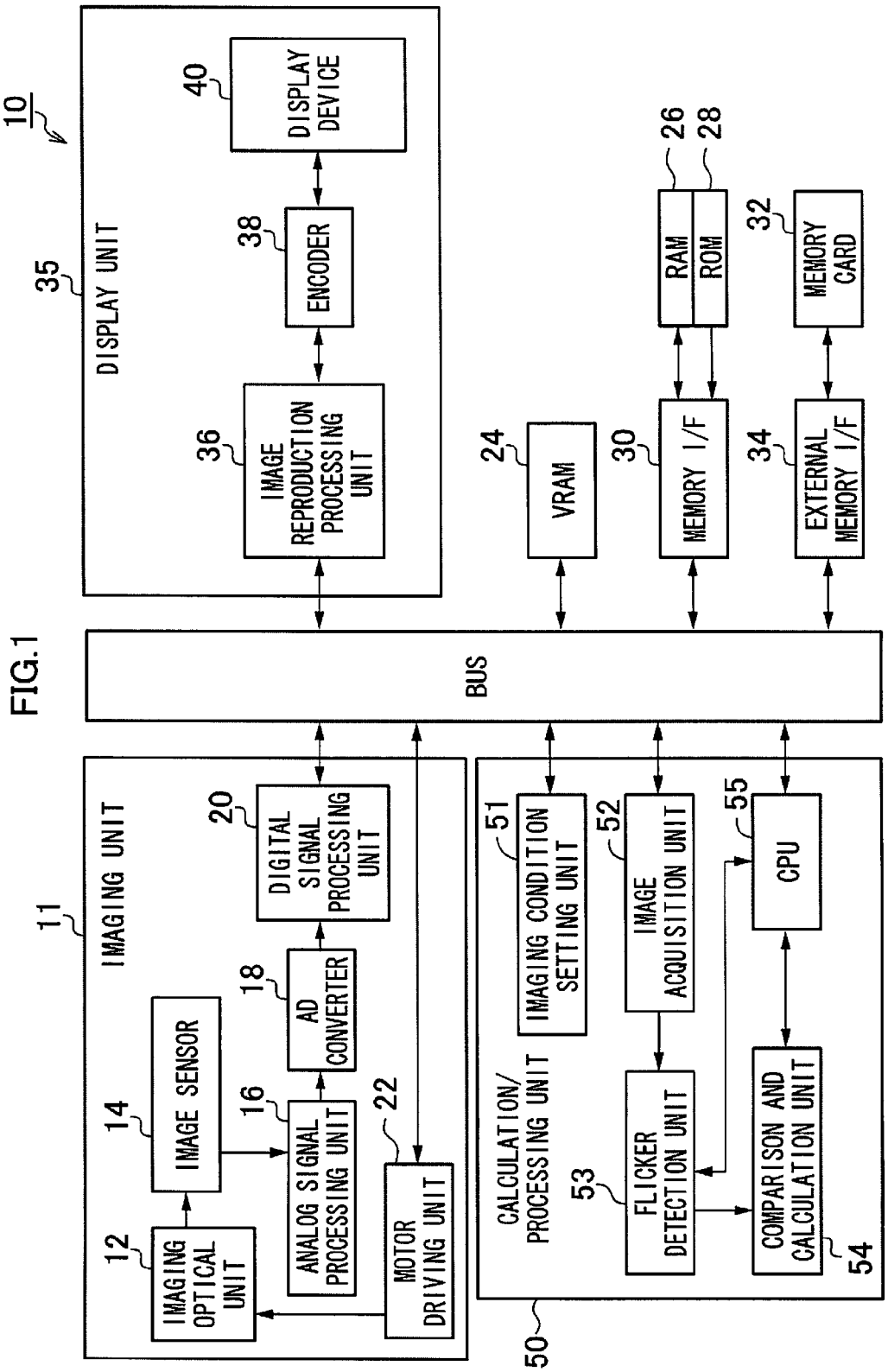
FIG. 1 is a block diagram illustrating an entire configuration of an imaging apparatus in a first embodiment.

FIG. 1 is a block diagram illustrating an entire configuration of an imaging apparatus 10 according to a first embodiment.

The imaging apparatus 10 includes an imaging unit 11 that images a subject, a display unit 35 that performs display, and a calculation/processing unit 50 that performs various types of calculations and processing such as flicker detection processing and LED detection processing.

The imaging unit 11 includes an imaging optical unit 12 that performs a subject image on an image sensor 14, described below, the image sensor 14 that images a subject, an analog signal processing unit 16 that subjects an analog image capture signal output from the image sensor 14 to signal processing such as amplification, an AD converter 18 that converts the analog image capture signal (a captured image) into a digital image capture signal, and a digital signal processing unit 20 that subjects the digital image capture signal to various types of digital signal processing. The digital image capture signal output from the imaging unit 11 is temporarily stored in a RAM (Random Access Memory) 26 as a captured image of digital data. The imaging optical unit 12 includes optical devices such as a focus lens, a zoom lens, and an iris (diaphragm). The image sensor 14 is configured by a CMOS (Complementary Metal Oxide Semiconductor) image sensor, a CCD (Charge Coupled Device) image sensor or the like. Each of the analog signal processing unit 16, the AD converter 18, and the digital signal processing unit 20 is composed of a known circuit.

A display unit 35 includes an image reproduction processing unit 36 that performs image processing for reproducing the captured image, an encoder 38 that performs coding for displaying data of the captured image on a display device 40, and the display device 40 that displays the captured image or the like. The image reproduction processing circuit 36 and the encoder 38 are respectively composed of known microprocessors and circuits. The display device 40 is configured by an LCD (Liquid Crystal display device), for example.

A VRAM (Video Random Access Memory) 24 is a memory that temporarily stores an image. A memory interface (memory I/F) 30 is a circuit that interfaces with the RAM 26 and a ROM (Read-Only Memory) 28. An external memory interface (external memory I/F) 34 is a circuit that interfaces with a memory card 32.

The calculation/processing unit 50 includes an imaging condition setting unit 51 that sets various types of imaging conditions such as a shutter speed (an exposure time) in the imaging unit 11, an image acquisition unit 52 that acquires a captured image, a flicker detection unit 53 that divides the captured image into a plurality of divided areas and detects a flicker that periodically flashes for each of the divided areas, a comparison and calculation unit 54 that compares, for each of the divided areas where the flicker has been detected, a luminance in a turn-on state of the divided area and a luminance thereof in a turn-off state thereof, and determines whether the divided area is an LED area including light from an LED based on a luminance difference between the turn-on state and the turn-off state, and a CPU (Central Processing Unit) 55 that integrates and controls respective units in the imaging apparatus 10. The calculation/processing unit 50 is configured by a microprocessor and a circuit. The imaging condition setting unit 51 includes an operation device that receives an instruction input from a user. The imaging condition setting unit 51 may read out an imaging condition previously stored in a nonvolatile memory (not illustrated) and set the imaging condition.

A luminance difference in a monochrome LED that generates a flicker will be described below.

Since, in an incandescent lamp bulb and a fluorescent lamp, a luminance response to an AC (Alternating Current) voltage period is slow, a variation in luminance does not correspond to a maximum/minimum periodical variation in voltage, and a difference between the highest luminance and the minimum luminance becomes small. On the other hand, in the LED, the speed of a luminance response to rise and fall of the voltage is significantly higher than that of the other light source, due to its device characteristic. For example, that of the incandescent lamp bulb is several hundred milliseconds, that of the fluorescent lamp is approximately 1 second, and that of the LED is 10 nanoseconds. In a brake lamp of an automobile, for example, a risk notification to the following automobile can be quickly made using high responsiveness of the LED.

The frequency of an AC power source used for the LED is a minimum of 50 Hz, and one period of a flicker in the LED using the AC power source is 20 ms or less.

More specifically, since a luminance response of the LED is sufficiently low relative to the period of the AC power source, a variation in maximum value/minimum value of a luminance follows a variation in maximum value/minimum value of the voltage. In other words, a difference between a maximum luminance and a minimum luminance in an LED area of a captured image corresponds to a difference between a minimum luminance (i.e., zero) and a maximum luminance of the LED.

Therefore, the LED area in the captured image is detected in the following procedure to detect the LED area with high accuracy.

(Procedure 1) The subject is continuously imaged at a frequency (1/100 s or less or 1/120 s or less in terms of a shutter speed) that is two times or more the frequency of the AC power source (e.g., 50 Hz or 60 Hz). A shutter speed (an exposure time), which is less than one-half of one period of the AC power source, is desirable. The imaging condition setting unit 51 sets such a shutter speed in the imaging unit 11.

(Procedure 2) If a variation period of a luminance within an area to be determined is substantially identical to a variation period of the AC power source, it is determined that there is a flicker. A flicker detection unit 53 performs such flicker detection. However, the measure of the closeness of agreement between both the periods may not be high. In normal flashing (illumination) for a visual effect, since human eyes cannot determine whether the flashing occurs due to an image lag effect, quick flashing, like in the variation period of the AC power source, does not exist.

(Procedure 3) In case that a luminance difference in flashing (a difference between a luminance of the LED area in a turn-on state and a luminance of the LED area in a turn-off state) is large, it is determined that it is the LED area. It may be determined that the area is the LED area by detecting that a luminance value in the turn-off state is substantially zero. A comparison and calculation unit 54 performs such detection of the LED area.

An area corresponding to an LED within a detection target area (a divided area of an image) may be small depending on the size of the detection target area. Therefore, a threshold value of the luminance or the luminance difference for determining that the area is the LED area is given a certain degree of allowable range, to perform LED detection.

Figure 2:
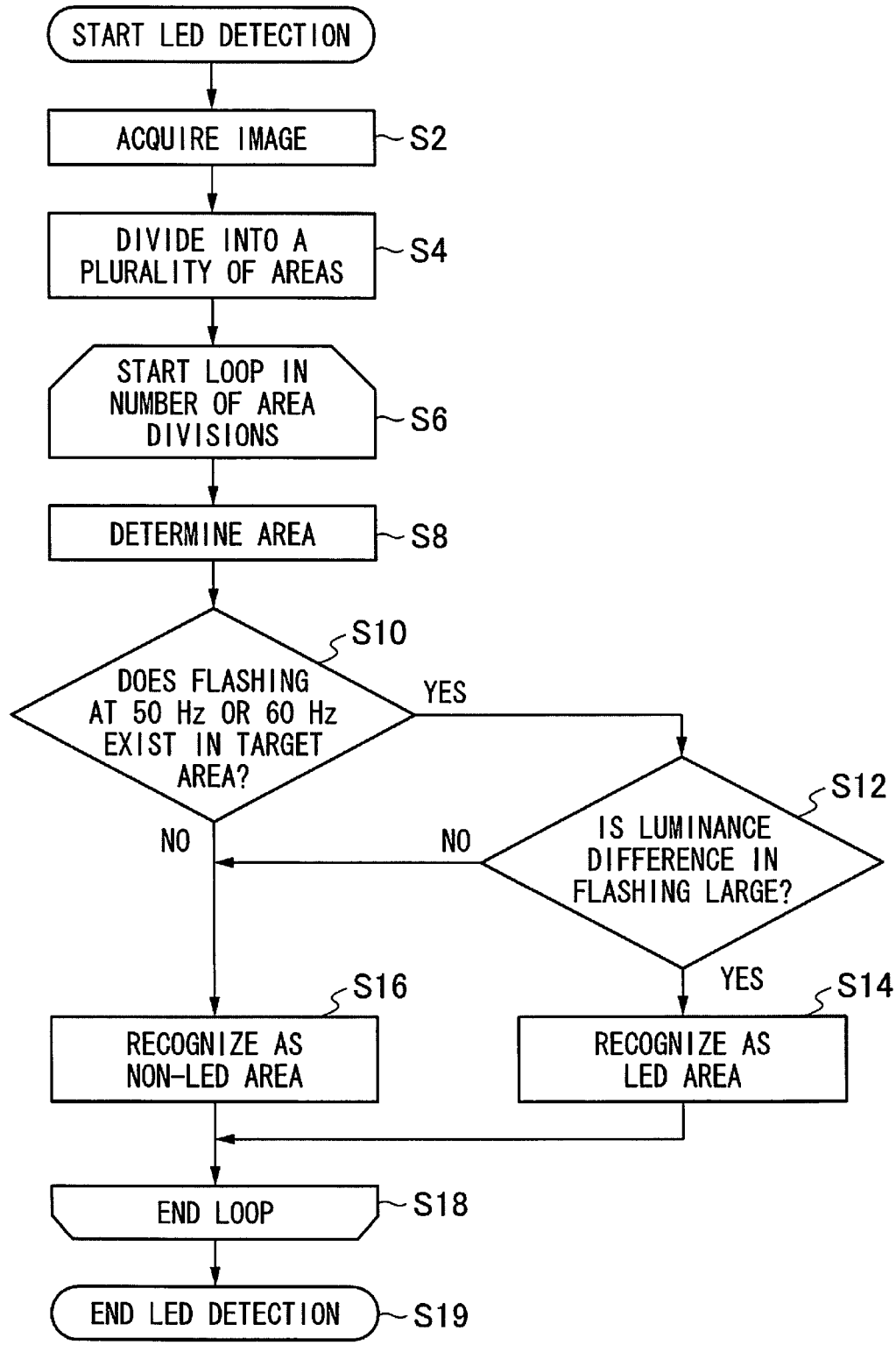
FIG. 2 is a flowchart illustrating an example of LED detection processing in the first embodiment.

FIG. 2 is a flowchart illustrating LED detection processing. This processing is performed according to a program under control of the CPU 55. LED detection processing for detecting an LED area, which periodically flashes, from a captured image will be described below with reference to FIG. 2. In this example, the captured image output from the imaging unit 11 is stored in the RAM 26.

The image acquisition unit 52 first acquires the captured image, which has been continuously captured, from the RAM 26 (an image buffer) (step S2).

The flicker detection unit 53 then divides the captured image into a plurality of (n) divided areas in a two-dimensional array (step S4).

Loop processing (steps S6 to S18) is started in the number of divided areas n. First, the divided area to be paid attention to (hereinafter referred to as a "target area") is determined (step S8), and it is determined whether periodical flashing (a flicker) exists in the target area (step S10). For example, it is determined, for each of the divided areas, whether the divided area is flashing at a frequency of the AC power source based on a luminance in a time series of the divided area from a plurality of captured images obtained by continuously imaging a subject at a frequency that is an integral multiple of (but 2 times or more) the frequency (50 Hz or 60 Hz in this example) of the AC power source. More specifically, the subject is continuously imaged at an exposure time (shutter speed) that is one-half or less of one period of the AC power source, to detect periodical flashing. It does not matter what detection accuracy a flashing period has. It may be detected that the flashing is substantially periodical.

If the periodical flashing is detected (YES in step S10), the comparison and calculation unit 54 determines whether a luminance difference in the flashing is large (step S12). For example, since a luminance value in the turn-off state of the LED is substantially zero, when it is determined that a luminance in the turn-on state is a threshold value or more, and the luminance value in the turn-off state is substantially zero, it may be determined that the luminance difference in the flashing is large. It may be determined whether the luminance difference in the flashing is large by calculating a difference between a luminance in the turn-on state (when the luminance is high) in a target area where the flashing has been detected and a luminance in the turn-off state (when the luminance is low) in the target area and comparing the luminance difference between the luminance in the turn-on state and the luminance thereof in the turn-off state with a threshold value. It may be determined whether the luminance difference in the flashing is large by comparing the ratio of the luminance in the turn-on state and the luminance thereof in the turn-off state with the threshold value.

The CPU 55 determines that the target area is an LED area when it determines that the luminance difference in the flashing is large, and stores an LED area flag in the RAM 26 as a part of LED area information in association with the corresponding divided area (step S14). On the other hand, the CPU 55 determines that the target area is an area other than the LED area (a non-LED area) when the luminance difference is the threshold value or less, and stores a non-LED area flag in the RAM 26 as a part of the LED area information in association with the corresponding divided area (step S16).

When the loop processing is ended (step S18), the CPU 55 stores the LED area information (including the LED area flag and the non-LED area flag) temporarily stored in the RAM 26 in the memory card 32 using the external memory interface 34 in association with the captured image (step S19). The LED area information represents the LED area in the captured image. An array of the LED area flag and the non-LED area flag represents a position of the LED area in the captured image. The LED area information more preferably includes color information and luminance information on each of the LED areas.

While a case where an LED detection result is output to the memory card 32 serving as a storage medium has been described by way of example, the presently disclosed subject matter is not particularly limited to such a case. Means for outputting the LED detection result is not particularly limited to the storage medium. For example, it may be sent and output to an external apparatus in association with each of frames of the captured image, which has been continuously captured, via a network interface (not illustrated). Alternatively, it may be displayed and output to the display device 40 in association with the captured image.

The CPU 55 may calculate an exposure amount based on the detected LED area information, and cause the imaging unit 11 to perform imaging depending on the exposure amount. The exposure amount is adjusted under control of the CPU 55 depending on a shutter speed (an exposure time) of an electronic shutter in the image sensor 14 and a diaphragm amount (an aperture amount) of an iris (a diaphragm) of the imaging optical unit 12.

Second Embodiment

Figure 3:
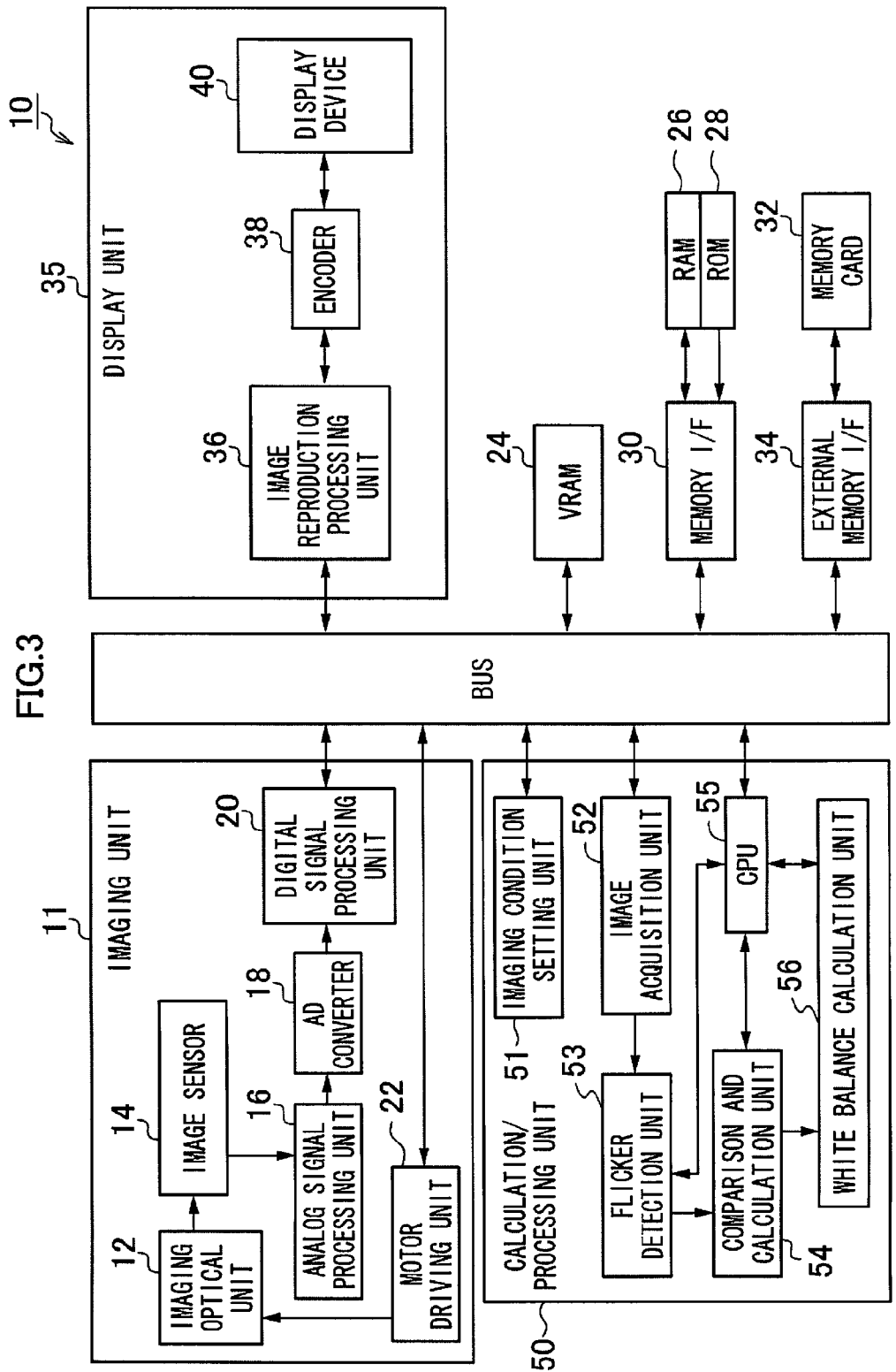
FIG. 3 is a block diagram illustrating an entire configuration of an imaging apparatus in a second embodiment.

FIG. 3 is a block diagram illustrating the overall configuration of an imaging apparatus 10 in a second embodiment. The same constituent elements as those in the first embodiment illustrated in FIG. 1 are assigned the same reference numerals, and hence description thereof is not repeated.

In FIG. 3, a white balance calculation unit 56 determines a light source color of a captured image based on a comparison result of a comparison and calculation unit 54, and calculates a white balance adjustment value based on the light source color. The white balance calculation unit 56 specifically determines that an LED area is an object color area that is strongly affected by an object color while determining the light source color based on information within an area, other than the LED area, in the captured image.

A CPU 55 adjusts a white balance of the captured image based on the white balance adjustment value calculated by the white balance calculation unit 56.

Figure 4:
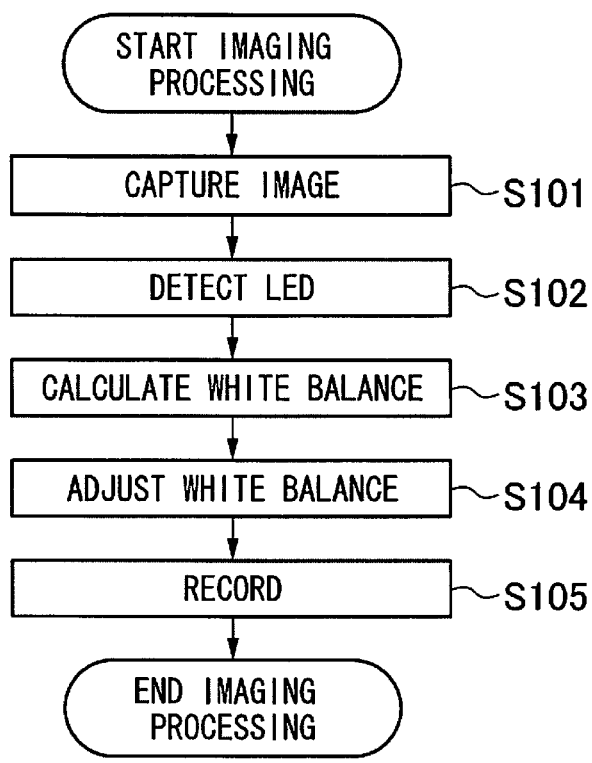
FIG. 4 is a schematic flowchart illustrating an example of imaging processing.

FIG. 4 is a schematic flowchart illustrating an example of imaging processing. This processing is performed according to a program under control of the CPU 55.

First, an imaging unit 11 images a subject (step S101). Then, a flicker detection unit 53 and a comparison and calculation unit 54 in a calculation/processing unit 50 detect an LED area, which periodically flashes, from the captured image (step S102). The white balance calculation unit 56 in the calculation/processing unit 50 then calculates a white balance adjustment value based on a detection result (LED area information) of the LED area (step S103). The CPU 55 in the calculation/processing unit 50 then adjusts the white balance of the captured image according to the white balance adjustment value (S104). An external memory interface 34 then records the captured image, the white balance of which has been adjusted, in a memory card 32 (step S105).

Figure 5:
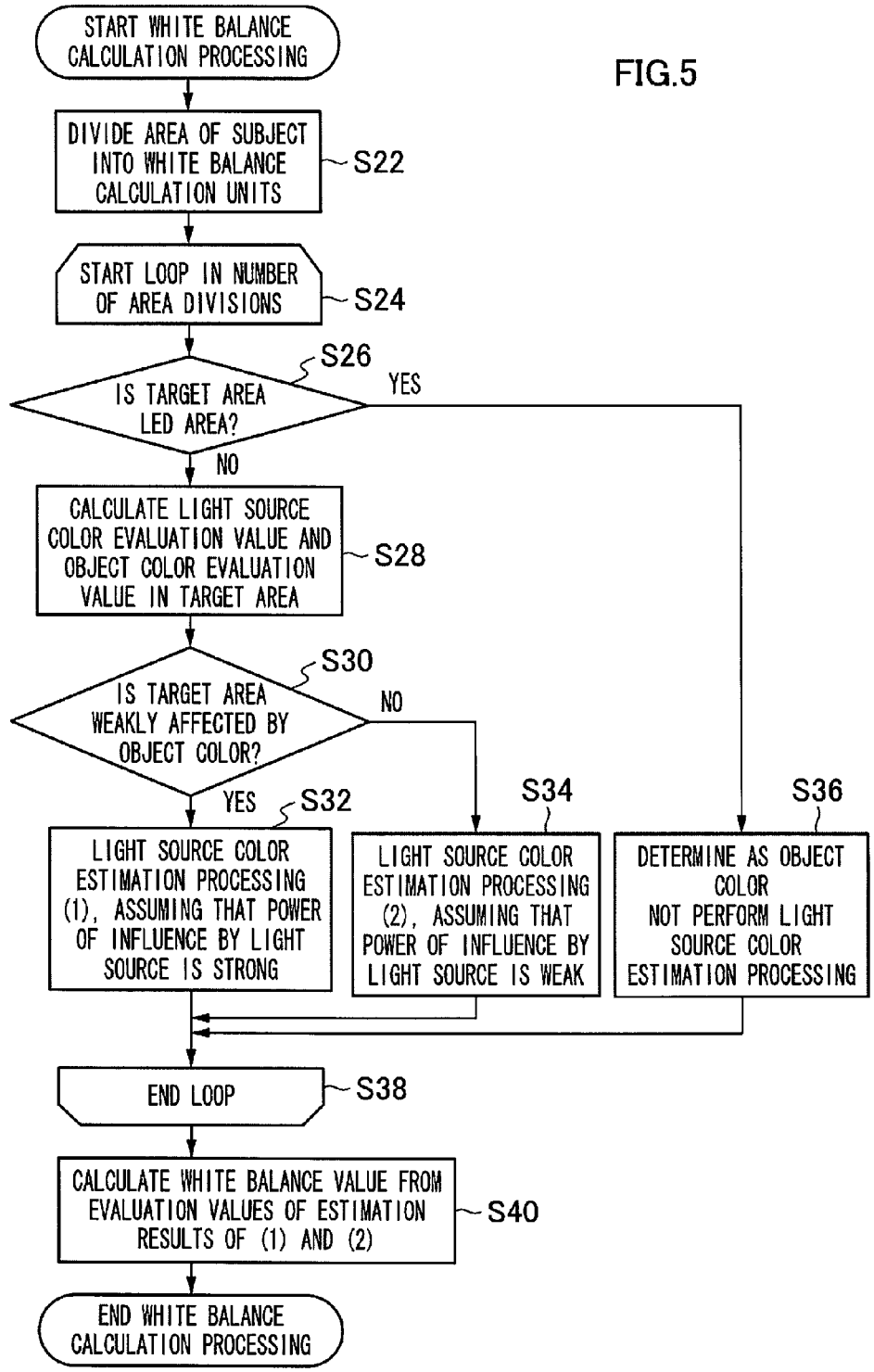
FIG. 5 is a flowchart illustrating an example of white balance calculation processing in the second embodiment.

FIG. 5 is a flowchart illustrating details of white balance calculation processing (step S103 illustrated in FIG. 4) in the second embodiment. The white balance calculation unit 56 performs this processing according to a program.

First, an effective area of the captured image (an area of the subject) is divided into a plurality of divided areas in white balance calculation units (step S22).

Then, loop processing is started in the number of area divisions (step S24), and it is determined whether a divided area paid attention to (hereinafter referred to as a "target area") is an LED area according to a comparison result of the comparison and calculation unit 54 (step S26).

If the target area is a non-LED area, a light source color evaluation value and an object color evaluation value in the target area are calculated (step S28), and it is determined whether the target area is weakly affected by the object color based on the calculated two evaluation values (step S30). If it is determined that the effect of the object color is weak, light source color estimation processing is performed, assuming that the effect of a light source is strong (step S32). If it is determined that the effect of the object color is strong, light source color estimation processing is performed, assuming that the effect of the light source is weak (step S34).

If it is determined that the target area is a LED area in step S26, the target area (i.e., the LED area) is determined to be an object color area where the effect of the object color is strong, and the target area (LED area) is excluded from the light source estimation processing (step S36).

When the loop ends by the number of divided areas in step S38, a white balance correction value is calculated based on light source color estimation results in steps S32 and S34 (step S40). More specifically, the light source color is determined based on color information on the non-LED area, other than the LED area, in the captured image, and a white balance correction value is calculated based on the light source color.

A monochrome LED (an LED in which a maximum value of a spectral characteristic corresponds to one wavelength) is used in many cases as not for an illumination purpose from its characteristic but as being directly viewed. Examples include a traffic light, an illumination, and an electric bulletin board. Such a monochrome LED is a light source that is emitting light, the monochrome LED itself may be directly photographed as a subject, unlike a light source for an illumination purpose, and has color information, like a normal subject. From the viewpoint of white balance adjustment, the color of the monochrome LED is desirably excluded from light source determination not as a light source color (e.g., a white color) but an object color. More specifically, the accuracy of the white balance is improved.

Third Embodiment

Figure 6:
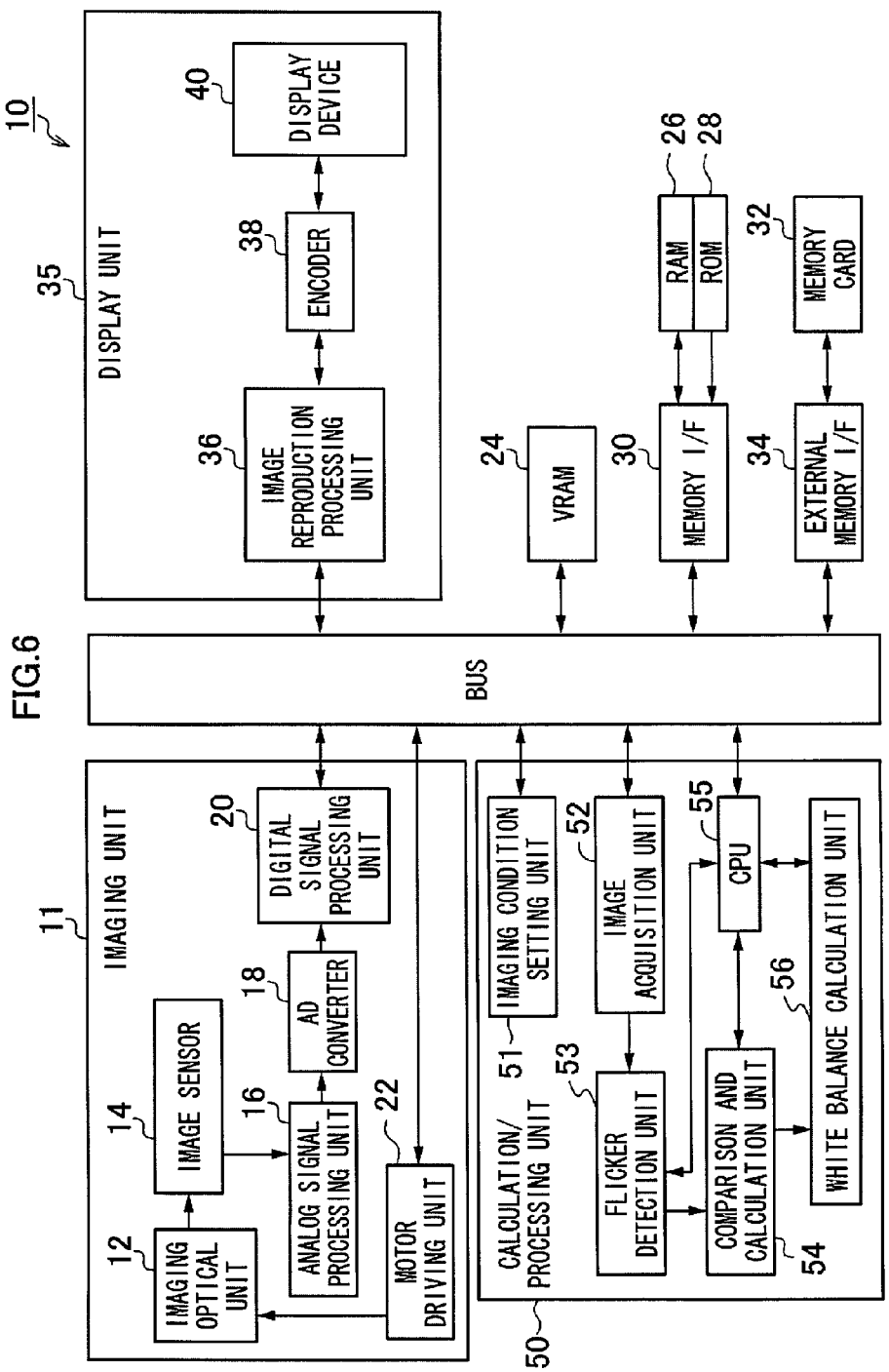
FIG. 6 is a block diagram illustrating an entire configuration of an imaging apparatus in a third embodiment.

FIG. 6 is a block diagram illustrating an entire configuration of an imaging apparatus 10 in a third embodiment. The same constituent elements as those in the second embodiment illustrated in FIG. 3 are assigned the same reference numerals, and hence description thereof will be omitted.

Figure 7:
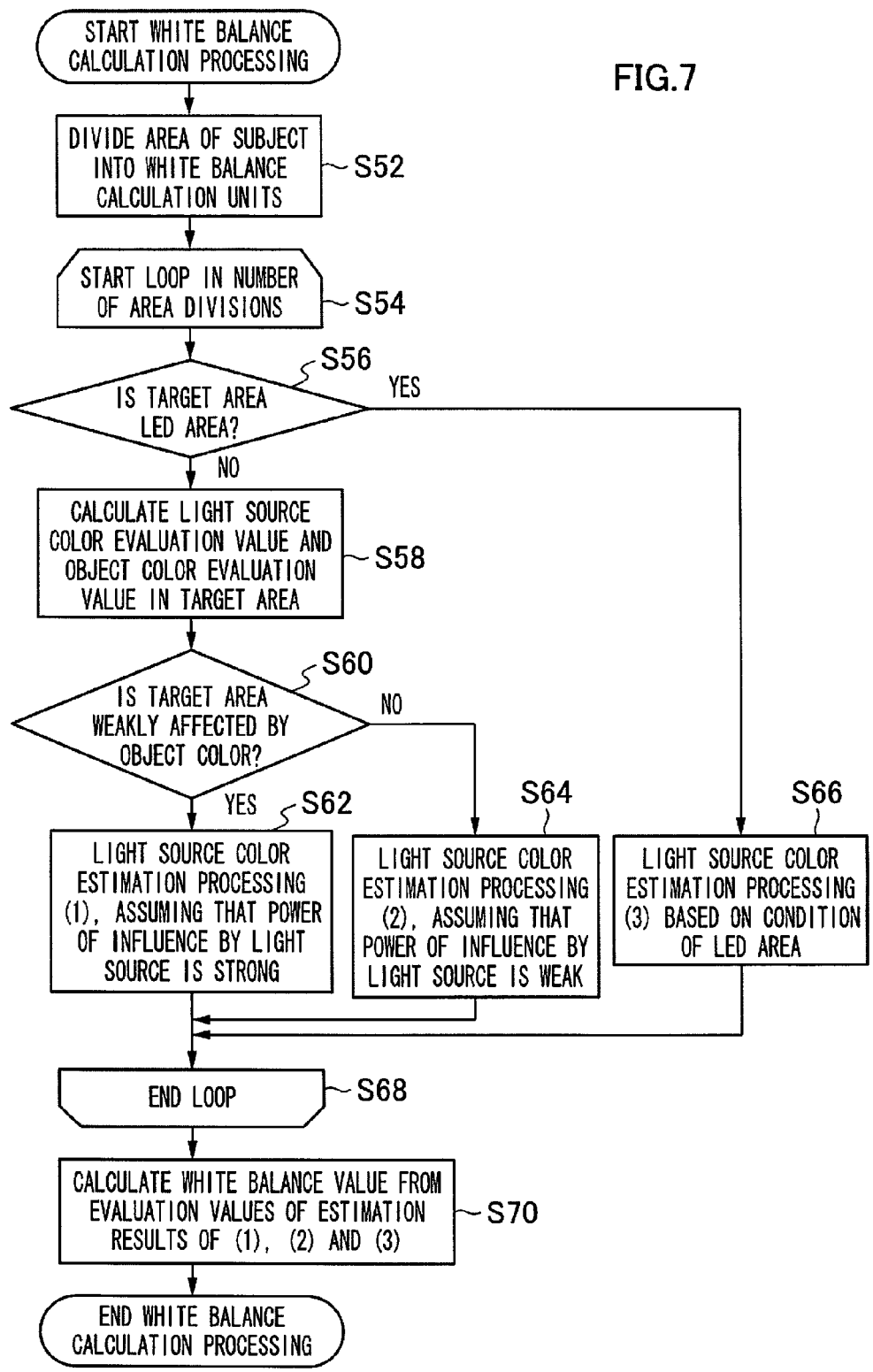
FIG. 7 is a flowchart illustrating an example of white balance calculation processing in the third embodiment.

FIG. 7 is a flowchart illustrating details of white balance calculation processing (step S103 illustrated in FIG. 4) in the third embodiment. A white balance calculation unit 56 performs this processing according to a program.

Steps S52 to S64 are similar to steps S22 to S34 illustrated in FIG. 5 in the second embodiment.

If it is determined that a target area is an LED area in step S56, the white balance calculation unit 56 performs light source color estimation processing based on a condition of the LED area (step S66).

A manner of the light source color estimation processing includes various ones. In the first aspect, if the ratio of an LED area in an entire area of a captured image is more than a threshold value, a light source color is determined based on at least one of a spectral characteristic of an LED and color information within the LED area in a turn-off state, and a white balance adjustment value is calculated based on the light source color. More specifically, if the ratio of the LED area in an entire subject is a predetermined value or more, erroneous determination and hatching occur when the light source color is determined only in the remaining non-LED area, and therefore the light source color is determined using the spectral characteristic of the LED or the color information within the LED area in the turn-off state. Further, if the ratio is large, a reference white balance of the apparatus is used.

In the second aspect, if a difference between the color of an LED area and an average of colors in the entire captured image (or an average of colors in the non-LED area, other than the LED area, in the entire area of the captured image) is more than a threshold value, a light source color different from the color of the LED area is determined from color information within the non-LED area, and a white balance adjustment value is calculated based on the light source color. More specifically, the light source color is determined, assuming that there exists a light source other than the LED.

In the third aspect, if a luminance of the LED area in a turn-off state is a threshold value or less, a light source color is determined based on color information within the area (non-LED area), other than the LED area, in the entire area of the captured image, and a white balance adjustment value is calculated based on the light source color. More specifically, if the luminance of the LED area is low, environment light may be stronger than light from the LED, and therefore the light source color is determined.

In the fourth aspect, if a luminance difference between a luminance of the LED area and a luminance of the non-LED area is less than a threshold value, a light source color is determined based on at least one of a spectral characteristic of the LED and color information within the LED area, and a white balance adjustment value is calculated based on the light source color. More specifically, the light source color is determined, assuming that reflected light close in an amount of light emission to the LED. On the other hand, if the luminance difference between the luminance of the LED area and the luminance of the non-LED area is more than the threshold value, environment light is significantly weak, and therefore it is determined that a white balance is not required, to use a reference white balance of the apparatus.

In the fifth aspect, a light source color is determined based on color information within the LED area in the turn-off state, and a white balance adjustment value is calculated based on the light source color.

In the sixth aspect, a follow-up intensity of a white balance adjustment value to an object color is adjusted based on detected color information within an LED area. For example, a white balance adjustment value, at which a color after white balance adjustment becomes closer to the color of the LED than when the LED area is not detected, is calculated.

Steps S68 to S70 are similar to steps S38 to S40 in the second embodiment. However, in step S70, if step S66 is performed, the white balance adjustment value is calculated from an evaluation value of a result of the light source estimation processing.

Fourth Embodiment

An imaging apparatus according to a fourth embodiment will be described below. An entire configuration of an imaging apparatus 10 according to the present embodiment is similar to that in the third embodiment illustrated in FIG. 6. Only different points from those in the third embodiment will be described below.

Figure 8:
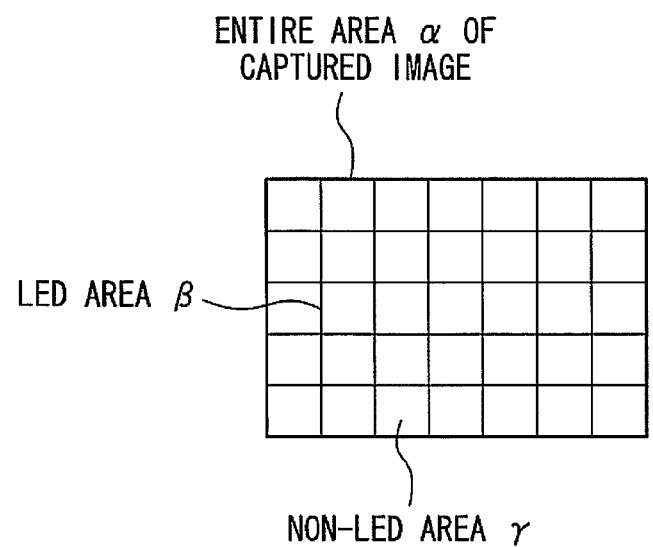
FIG. 8 is an illustration used to describe an entire area α of a captured image, an LED area β, and a non-LED area γ.

FIG. 8 illustrates an example of an entire area α of a captured image, an LED area β, and a non-LED area γ.

FIG. 9 is a flowchart illustrating white balance adjustment processing in the present embodiment. Auto while balance processing will be described with reference to FIG. 8.

First, a luminance difference (p–r) between an average luminance p during turn-on of the LED area β and an average luminance r of the non-LED area is compared with a luminance difference threshold value x (step S81).

If the luminance difference (p–r) is the luminance difference threshold value x or less, environment light can affect an area other than the LED area (the non-LED area), and therefore the processing is branched into processes (steps S82 to S94) for estimating a light source using information on the non-LED area.

If the luminance difference (p–r) is the luminance difference threshold value x or less, the area t of the LED area β is compared with a threshold value z of an area ratio of the entire area α of the captured image and the LED area β (step S82). Even f the average luminance r of the non-LED area γ is high, if a ratio (s-t) of the area t of the non-LED area γ in the entire area α of the captured image is small (i.e., if the ratio t of the LED area β in the entire area α is large), accurate light source estimation is difficult to perform. Therefore, if the ratio t of the LED area β is larger than the area ratio threshold value z, the processing is branched into processes for performing light source estimation (steps S83 to S87) using color information within the LED area in a turn-off state.

In the processing, loop processing is started in the number of area divisions n (step S83), and it is determined whether a divided area paid attention to is the LED area β (step S84). If the LED area is in the turn-off state, a light emission amount of the LED itself is substantially zero so that an object color can be excluded. Accordingly, if the target area is the LED area, light source color estimation is performed based on the color information within the LED area in the turn-off state (when a flicker is dark) (step S85). On the other hand, if the target area is the non-LED area, normal light source color estimation is performed (step S86). When the processing is repeated by the number of divided areas, the loop processing is ended (step S87).

If the ratio t of the LED area β is the area ratio threshold value z or less in step S82, the processing is branched into steps S88 to S94. In this case, the area t of the LED area β cannot be dominant over the entire area α, and the luminance r of the non-LED area can be at a predetermined level or more. Accordingly, there can be an effect of environment light. Even if the white balance adjustment value is calculated using the color information only within the non-LED area, a certain level of accuracy is obtained, but the color information within the LED area is also used so that the accuracy of the light source color estimation can be further improved.

Therefore, the loop processing is started in the number n of area divisions (step S88), and it is determined whether the divided area paid attention to is the LED area β (step S89).

Further, if it is the LED area, an average luminance q in the turn-off state of the LED area β is compared with a luminance threshold value y (step S90), light source color estimation is performed using the color information within the LED area in the turn-off state (step S91) if the average luminance q is larger than the luminance threshold value y, and light source color estimation is performed excluding the LED area (step S92) if the average luminance q is the luminance threshold value y or less. If the divided area to be paid attention to is the non-LED area, normal light source color estimation is performed (step S93). If the processing is repeated by the number of divided areas, the loop processing is ended (step S94).

If the luminance difference (p−r) is more than x in step S81, it is highly probable that a photographed scene (e.g., night scene) in which the effect of the LED serving as the object color is dominant appears. The average luminance q during turn-off of the LED area β is compared with the average luminance r of the non-LED area γ (step S95), if q<r, it is highly probable that the effect of the LED (but treated as the object color) is dominant, and there is no effect of environment light, and a reference gain prepared for the ROM 28 or the like is used as a white balance adjustment value (a white balance gain). If q≥r, the processing is branched into processes (steps S83 to S87) for performing light source color estimation using color information during turn-off of the LED area.

While a case where the presently disclosed subject matter is applied to an imaging apparatus such as a camera has been described by way of example, the presently disclosed subject matter is not particularly limited to such a case. It goes without saying that the presently disclosed subject matter may be applied to another image processing for detecting an LED area including light from an LED that periodically flashes from a captured image. For example, the presently disclosed subject matter is applicable to various types of portable electronic apparatuses such as a mobile phone and various types of computer apparatuses such as a personal computer and a server apparatus.

While a case where white balance adjustment is performed for a captured image in which a flicker and an LED area have been detected by way of example as image processing based on a detection result of the LED area, white balance adjustment may be performed for a captured image, which has been captured subsequently in time to the captured image to which the detection is performed. For example, flicker detection and LED detection may be performed in a live view image, which is to be captured continuously in time immediately before a shutter switch is pressed, and white balance adjustment may be performed for a captured image after the shutter switch is pressed.

While a case where white balance adjustment is performed based on LED area information has been described by way of example, the presently disclosed subject matter is not particularly limited to such a case. The presently disclosed subject matter may be applied to a case where image processing other than the white balance adjustment is performed, and the imaging condition setting unit 51 may switch imaging conditions (e.g., an exposure amount, an angle of view, etc.) based on the LED area information, for example. The presently disclosed subject matter may be applied to an LED detection apparatus that only outputs an LED detection result without performing image processing other than LED detection processing (i.e., a case where another apparatus performs processing subsequent to the LED detection processing).

The presently disclosed subject matter is not limited to an example described in the present specification and an example illustrated in the drawings, and it will be obvious that various design changes and modifications may be made without departing from the scope of the presently disclosed subject matter.

What is claimed is:

1. An image processing apparatus comprising:
    an image acquisition device configured to acquire a captured image obtained by continuous imaging;
    a flicker detection device configured to divide the captured image into a plurality of divided areas and detect a flicker that flashes for each of the divided areas; and
    a comparison device configured to detect, for each of the divided areas where the flicker has been detected, whether a divided area is an LED area including light from a light-emitting diode (LED) based on a luminance difference between a luminance in a turn-on state of the divided area and a luminance thereof in a turn-off state, and output LED area information representing the LED area within the captured image.

2. The image processing apparatus according to claim 1, further comprising:
    a white balance calculation device configured to calculate a white balance adjustment value based on the LED area information detected; and
    a white balance adjustment device configured to adjust a white balance of the captured image or an image that has been captured subsequently to the captured image, based on the calculated white balance adjustment value.

3. The image processing apparatus according to claim 2, wherein the white balance calculation device determines that the LED area is an object color area that is strongly affected by an object color while determining a light source color based on information within an area, other than the LED area, in the captured image, to calculate the white balance adjustment value based on the light source color.

4. The image processing apparatus according to claim 2, wherein the white balance calculation device determines, when a ratio of the LED area in the captured image is more than a threshold value, a light source color based on at least one of a spectral characteristic of the LED and information within the LED area, to calculate the white balance adjustment value based on the light source color.

5. The image processing apparatus according to claim 2, wherein the white balance calculation device determines a light source color different from a color of the LED area, when a difference between the color of the LED area and an average of colors in the entire captured image or an average of colors in a non-LED area, other than the LED area, in the captured image is more than a threshold value, from information within the non-LED area, to calculate the white balance adjustment value based on the light source color.

6. The image processing apparatus according to claim 2, wherein the while balance calculation device determines, when a luminance of the LED area in the turn-off state is a threshold value or less, a light source color based on information within an area, other than the LED area, in an entire area of the captured image, to calculate the white balance adjustment value based on the light source color.

7. The image processing apparatus according to claim 2, wherein the white balance calculation device determines, when a luminance difference between a luminance of the LED area and a luminance of a non-LED area is less than a threshold value, the light source color based on at least one of a spectral characteristic of the LED and information within the LED area, to calculate the white balance adjustment value based on the light source color.

8. The image processing apparatus according to claim 2, wherein the white balance calculation device determines the light source color based on information within the LED area in the turn-off state, to calculate the white balance adjustment value based on the light source color.

9. The image processing apparatus according to claim 2, wherein the white balance calculation device adjusts a follow-up intensity of the white balance adjustment value to the object color based on detected information within the LED area.

10. The image processing apparatus according to claim 1, wherein the LED area information is recorded on a recording medium in association with the captured image.

11. An imaging apparatus comprising:
the image processing apparatus according to claim 1; and
an imaging device capable of continuously imaging a subject.

12. The imaging apparatus according to claim 11, wherein an exposure amount is calculated based on the LED area information detected, and the imaging device performs imaging depending on the exposure amount.

13. An image processing method comprising:
a step of acquiring a captured image obtained by continuous imaging;
a step of dividing the captured image into a plurality of divided areas;
a step of detecting a flicker that flashes for each of the divided areas; and
a step of detecting, for each of the divided areas where the flicker has been detected, whether a divided area is an LED area including light from a light-emitting diode (LED) based on a luminance difference between a luminance in a turn-on state of the divided area and a luminance thereof in a turn-off state; and
a step of outputting LED area information representing the LED area within the captured image.

14. A white balance adjustment method comprising:
a step of acquiring a captured image obtained by continuous imaging;
a step of dividing the captured image into a plurality of divided areas;
a step of detecting a flicker that flashes for each of the divided areas;
a step of detecting, for each of the divided areas where the flicker has been detected, whether a divided area is an LED area including light from a light-emitting diode (LED) based on a luminance difference between a luminance in a turn-on state of the divided area and a luminance thereof in a turn-off state, and generating LED area information representing the LED area within the captured image;
a white balance calculation step of calculating a white value adjustment value based on the LED area information detected; and
a step of adjusting a white balance of the captured image or an image, which has been captured subsequently to the captured image, based on the calculated white balance adjustment value.

15. The white balance adjustment method according to claim 14,
wherein in the white balance calculation step, the LED area is determined to be an object color area that is strongly affected by an object color while a light source color is determined based on information within an area, other than the LED area, in the captured image, to calculate the white balance adjustment value based on the light source color.

16. The white balance adjustment method according to claim 14,
wherein in the white balance calculation step, a light source color is determined based on at least one of a spectral characteristic of the LED and information within the LED area when a ratio of the LED area in the captured image is more than a threshold value, to calculate the white balance adjustment value based on the light source color.

17. The white balance adjustment method according to claim 14,
wherein in the white balance calculation step, a light source color different from a color of the LED area is determined, when a difference between the color of the LED area and an average of colors in the entire captured image or an average of colors in a non-LED area, other than the LED area, in the entire captured image is more than a threshold value, from information within the non-LED area, to calculate the white balance adjustment value based on the light source color.

18. The white balance adjustment method according to claim 14,
wherein in the white balance calculation step, a light source color is determined based on information within an area, other than the LED area, in an entire area of the captured image when a luminance of the LED area in the turn-off state is a threshold value or less, to calculate the white balance adjustment value based on the light source color.

19. The white balance adjustment method according to claim 14,
wherein in the white balance calculation step, the light source color is determined based on at least one of a spectral characteristic of the LED and information within the LED area when a luminance difference between a luminance of the LED area and a luminance of a non-LED area is less than a threshold value, to calculate the white balance adjustment value based on the light source color.

20. The white balance adjustment method according to claim 14,
wherein in the white balance calculation step, the light source color is determined based on a luminance within the LED area in the turn-off state, to calculate the white balance adjustment value based on the light source color.

21. The white balance adjustment method according to claim 14,
wherein in the white balance calculation step, a follow-up intensity of the white balance adjustment value to an object color is adjusted based on information within the detected LED area.

* * * * *